April 18, 1933.  C. A. CAMPBELL  1,903,978
AUTOMOTIVE BRAKE SYSTEM
Filed Aug. 8, 1928   2 Sheets-Sheet 1
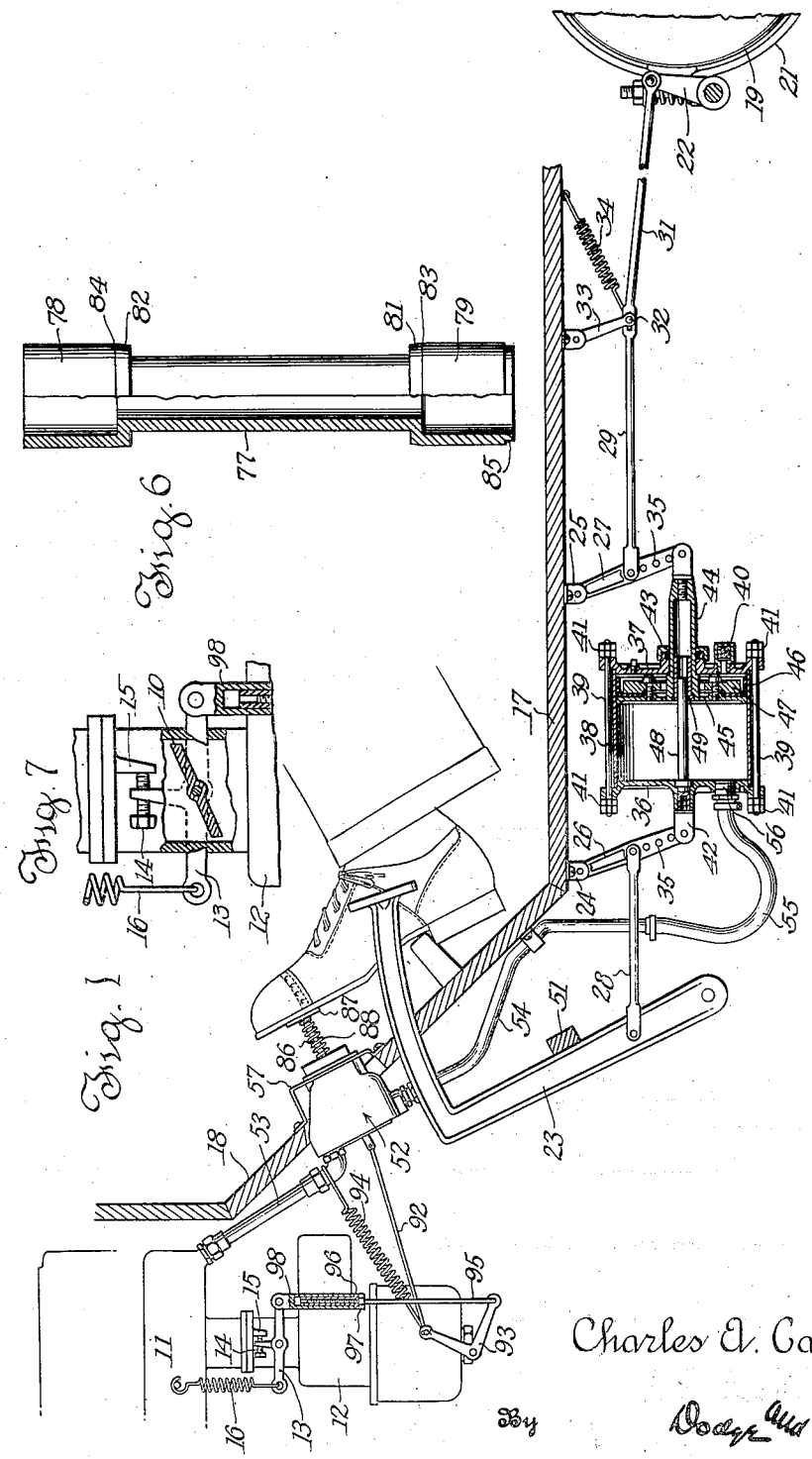
Inventor
Charles A. Campbell
By
Attorneys

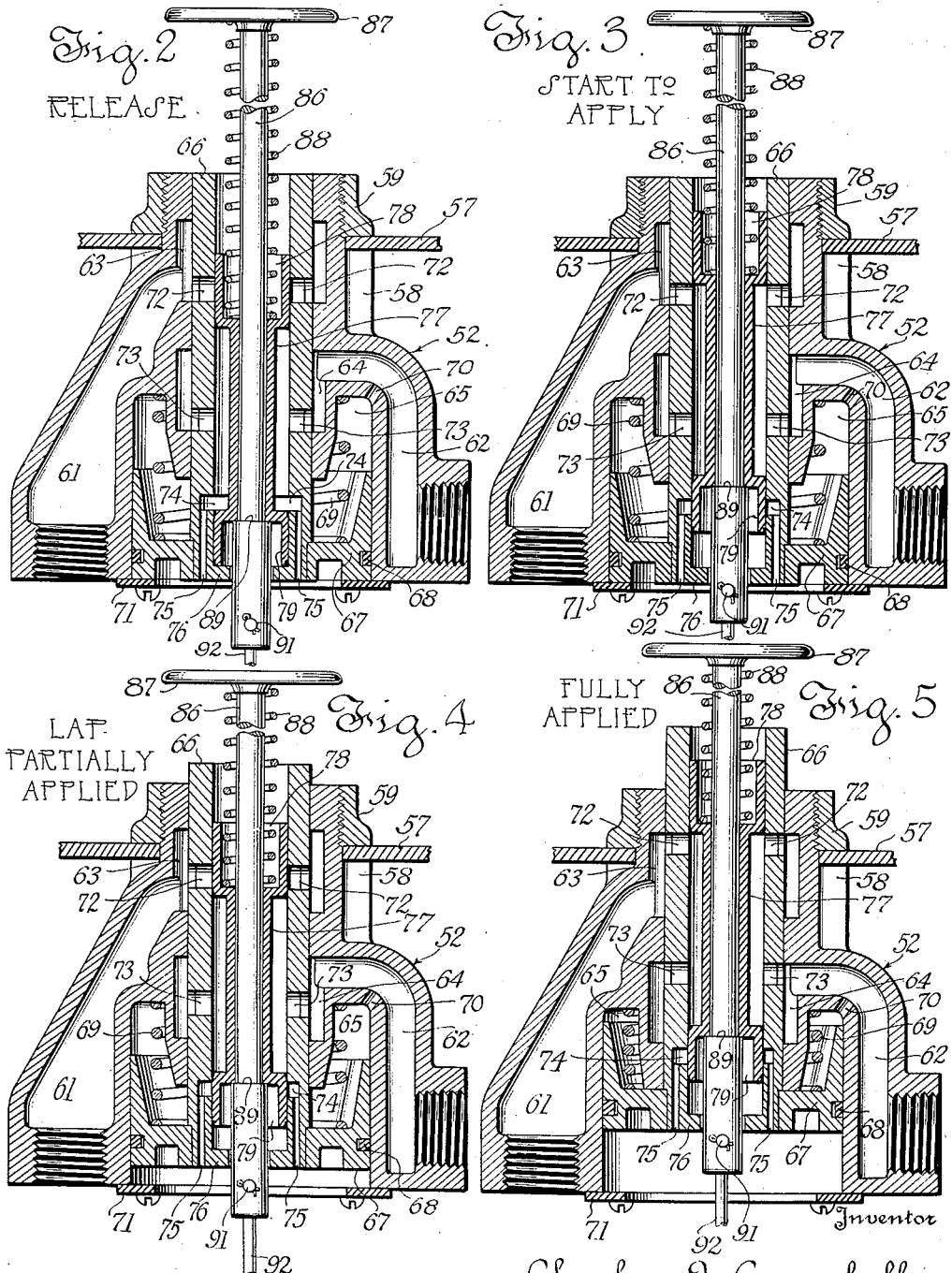

Patented Apr. 18, 1933

1,903,978

UNITED STATES PATENT OFFICE

CHARLES A. CAMPBELL, OF WATERTOWN, NEW YORK, ASSIGNOR TO THE NEW YORK AIR BRAKE COMPANY, A CORPORATION OF NEW JERSEY

AUTOMOTIVE BRAKE SYSTEM

Application filed August 8, 1928. Serial No. 298,229.

This invention relates to fluid pressure brake systems, and particularly to so-called vacuum systems in which the necessary suction is derived by connecting the brake system to the intake manifold of an internal combustion engine.

The system makes use of a number of mechanisms and principles which, individually considered, are well known, but which, so far as applicant is aware, have never been combined in a cooperative relation, and which have demonstrated in combination peculiar utility and value.

Many efforts have been made to apply intake manifold suction to the operation of fluid pressure brakes on motor cars. Two lines of effort have been followed. The first, and commercially the more common type, is known as the servo-motor type and is arranged so that when the operator depresses the ordinary foot pedal the brake motor assists him in this effort. The other type, commonly called the straight power type, makes use of a brake valve entirely distinct from the brake pedal and seeks to produce a graduated power application of the brakes without depression of the ordinary foot pedal by the operator.

The second type of brake presents advantages additional to those which may be secured by the servo-brake because it becomes mechanically possible to arrange the brake valve so that it may be actuated in harmony with the throttle. In fact it has been proposed to operate the accelerator and the brake valve by reverse movements of a single foot piece. From a manipulative standpoint this is an ideal arrangement.

Prior proposals, however, have involved structures entirely unsuited to use by the average motor car driver. For example, most of them have made use of a brake valve of the ordinary three-way cock type, tried and abandoned in the infancy of straight air brakes. While it is technically possible to make graduated application and graduated release with a three way cock, the cylinder and pipe volumes are so small that anything but the crudest graduation is unattainable. The difficulty is further complicated by the fact that the available suction in the intake manifold varies independently according to two conditions, i. e., the speed of the engine and the degree of opening of the throttle.

The present invention, in the preferred embodiment, eliminates one of these variable conditions, by so arranging the parts that the brakes are applied only when the throttle is in the idling position. The effect of variable engine speed can not, however, be eliminated. It is therefore essential to provide a brake valve which will not be harmfully affected in its response by variations in the manifold pressure.

One of the important features of the present invention centers around the provision of a valve of this character and one which will not conflict with the rather close clearance limitations imposed by the design of motor cars. It is also desirable that the brake cylinder be so connected to the brake rigging as to operate through the existing linkage and yet not prevent the application of the brake by the ordinary foot pedal in the event that the power brake should become ineffective for any cause. It is also important that the foot brake leverage ratio be not disturbed.

Generally stated, I make use of a suction cylinder which in release position is subject to atmospheric pressure at both ends. This cylinder is sustained by a pair of links, one connected to the cylinder and the other to the piston rod, the two links being interposed between sections of one of the pull rods forming part of the brake rigging. So arranged the device is applicable to brakes of any mechanical type, and it becomes possible to provide the suspending links with a series of holes which permit the attainment of different brake lever ratios for the cylinder without disturbing the foot brake lever ratio. In this way a single size of cylinder is rendered applicable to motor cars of various weights and adjustment is provided for different adhesions such as are incident to snow in winter and the like.

In its release position the piston is at its limit of motion and the piston and cylinder then serve merely as a connecting link element in the brake rigging so that foot actuation is possible.

The brake valve consists of two coacting valve members, one of which is shifted by the operator and the other of which moves against spring resistance according to the pressure differential between the two ends of the brake cylinder. Since one end of the brake cylinder is always subject to atmospheric pressure, this amounts to saying that the movable member is subject to the differential between atmospheric pressure and the pressure in the evacuated end of the brake cylinder. A spring whose characteristics will later be explained controls the progressive movement of this second valve member, and it thus becomes possible to set manually the brake valve, not only to establish, but also to maintain any desired pressure. The choice of a graduating piston spring of proper characteristics ensures smooth graduation on and off.

The device is further so contrived that in the limiting position of the manually operated element the pressure actuated valve element can not move far enough to lap the ports, so that the maximum braking effect possible is secured.

In the preferred embodiment of the invention the push rod which carries the accelerator button is slidable axially through and is guided by the manually adjustable valve element. When the button is depressed the accelerator rod acts through a spring to hold the valve element in brake releasing position and the depression of the rod progressively, results merely in the opening of the throttle. Reverse movement of the accelerator button, shortly after the closing of the throttle, displaces the movable valve member in a brake applying direction. The further it is displaced the further the pressure actuated valve element must move against the graduating spring to reach lap position. In this way the brakes are applied with progressively increasing intensity by allowing the accelerator button to move upward further and further from idling position. Inasmuch as it is the practice of most experienced drivers to make use of the friction of the engine for all moderate braking effects, this method of manipulation is one which is readily learned and which soon becomes instinctive.

The preferred embodiment of the invention is illustrated in the accompanying drawings, in which,—

Fig. 1 is a diagrammatic view, partly in section, showing so much of a motor vehicle as is necessary to explain the arrangement of the device.

Fig. 2 is an axial section of the brake valve in release position.

Fig. 3 is a similar view showing the position assumed by the parts at the commencement of a graduated application.

Fig. 4 is a similar view showing lap position with the brakes partially applied.

Fig. 5 is a similar view showing the valve in emergency position.

Fig. 6 is a view, partly in elevation and partly in section, showing the manually adjustable valve element.

Fig. 7 is a fragmentary view of the carbureter shown in Fig. 1, broken away to show the throttle valve.

Referring first to Fig. 1, 11 indicates the intake manifold of an internal combustion engine, for example, the ordinary gasoline engine used on motor vehicles. 12 is a carbureter and 13 is the throttle lever. This lever operates an ordinary throttle valve 10 (see Fig. 7), and in idling position, which is approximately the closed position of the throttle, an adjustable stop screw 14 on the lever 13 engages a limit stop 15. The lever 13 is urged toward idling position by a spring 16. A portion of the floor or frame work of an ordinary motor vehicle is conventionally represented at 17, and 18 is the inclined footboard. 19 represents a brake drum and 21 a brake band coacting therewith and capable of being contracted upon the drum by means of the usual cam mechanism (not shown) which is actuated by the lever 22. When the lever 22 swings in the counter clockwise direction the brakes are applied. The foot lever customarily used to operate the lever 22 is indicated at 23.

The parts so far described are merely representative of similar parts common to practically all automobiles and will take various forms according to the preference of designers.

In the conventional brake the levers 23 and 22 are connected by a tension link or by a plurality of tension links connected to each other. According to the present invention, a pair of brackets 24 and 25 are mounted on the frame member 17 and carry the swinging brake cylinder levers 26 and 27. The lever 26 is connected by link 28 with the foot lever 23 and the lever 27 is connected by two links 29 and 31 with the lever 22. The links 29 and 31 are pinned to each other at 32 and are there guided by a swinging link 33. A tension spring 34 operates to release the brakes.

Below the points of connection of the links 28 and 29 the levers 26 and 27 are each provided with a series of spaced holes 35 to give variable points of attachment for the brake cylinder. This cylinder is made up of two heads 36 and 37, a barrel portion 38 and a plurality of tie-rods 39 with nuts 41. The tie-rods clamp the heads in sealing relation with the opposite ends of the barrel. The head 36 carries at its center a boss 42 which is pivoted to the brake cylinder lever 26. The head 37 has a central aperture with a stuffing box 43 and through this works the tubular piston rod 44 connected to a brake piston 45. The head 37 is provided with an atmospheric port and dust strainer indicated generally by the numeral 40. The brake piston 45 works in the cylinder barrel 38 in which it is sealed by means of a cup-leather 46. The cup-leather 46 is clamped in place by means of a follower 47.

The guide rod 48 fixed in the head 36 slides through the bushing 49 and extends into the tubular piston rod 44. In this way the piston is guided independently of the barrel 38 and alinement is maintained at all times, notwithstanding the fact that the cylinder is supported at its rear end by the rod 44, which, as shown, is pivoted to the lower end of the lever 27. In release position the piston 45 is against the head 37 and in such case the brakes may be applied by depressing the foot lever 23 in the usual manner. Power application of the brakes is made by evacuating the space to the left of the piston 45. The effect is to draw the levers 26 and 27 toward each other. Since the lever 23 is arrested by the usual limit stop 51 the lever 22 is necessarily swung to the left to apply the brakes.

The brake valve is indicated generally on Fig. 1 by the numeral 52 applied to its body. It has a suction connection 53 with the intake manifold 11. The connection to the brake cylinder is made up of a pipe 54 and a flexible hose 55 connected thereto and to a suction nipple 56 in the head 36 of the brake cylinder.

Referring now to Figs. 2 to 6 inclusive, the body 52 is mounted on a supporting plate 57 which seats on lugs 58 and is locked in place by a ring nut 59. The body is formed with an intake manifold passage 61 and a brake cylinder passage 62. These terminate in threaded openings to which the pipes 53 and 54 are respectively connected. In the upper end of the body 52 is an axial cylindrical bore in which are annular grooves 63 and 64. The passage 61 communicates directly with the groove 63 and the passage 62 with the grooves 64. The lower end of the body 52 is formed with a cylinder 65. Mounted in the bore just mentioned is a cylindrical tubular valve seat 66 and fast on the end of the valve seat is an annular piston 67 which works in the cylinder 65. This piston is sealed by means of an ordinary snap ring 68 and is urged downward by a spring 69, its downward motion being limited by an annular stop plate 71 attached to the body 52 by screws, as shown, or in any other convenient manner. The space above the piston is in communication with the passage 62 by way of port 70.

The tubular valve seat 66 is provided with one or more through ports 72 which are known as the suction ports and which in all positions of the member 66 communicate with the groove 63. The sleeve 66 is also provided with one or more ports 73 which are known as the brake cylinder ports, and which in all positions of the member 66 are in communication with the annular groove 64. Near its lower end the sleeve 66 is provided with an annular groove exhaust port 74 which is connected by small passages 75 with atmosphere. The lower end of the sleeve 66 is closed, as indicated at 76 except for a small central passage through which the accelerator rod, hereinafter described, passes.

Slidable in the bore of the valve seat member 66 is the manually adjustable valve member indicated generally by the numeral 77. This comprises two spaced heads 78 and 79 which are slidable in the bore of the member 66 and a reduced tubular central portion which merely serves to connect the heads 78 and 79. At their proximate ends the heads 78 and 79 are slightly tapered, as shown at 81 and 82. The length of this taper is approximately 1/16" and the angle of the taper is approximately 3°.

Assuming that the lines 83, 84 which define the limits of the taper are the effective cut-off edges of the valve, the valve has very slight lap on the ports 72 and 74, as clearly shown in Fig. 4, but it will be observed that although the lap is approximately zero the very slight taper of the portions 81 and 82 gives a pronounced throttling effect upon displacement of the valve in either direction from the lap position. The lower head 79, in release position (see Fig. 2) seats against the closed end 76 of the member 66. As the accumulation of dust and dirt might prevent the valve from moving completely to release position, a small relief groove 85 is provided.

Making a close sliding fit with the bore of the valve member 77 is the accelerator push rod 86 which terminates in its upper end in the accelerator button 87. A coil spring 88 surrounds the rod and is confined between the lower face of the button 87 and the upper end of the valve 77. The push rod 86 is formed with a shoulder 89 which seats upward against the lower edge of the valve 77 and is provided with a hole at its lower end to receive the pin 91 which connects the throttle actuating link 92. The pin 91 also serves as a limit stop for the upward movement of the stem 86 relatively to sleeve 66 and piston 67 (see Figs. 3 and 5).

Now referring to Fig. 1, the link 92 is connected to one arm of a bell crank 93. A return spring 94 is connected to rotate the bell crank 93 clockwise, that is in such direction as to move the accelerator push rod 86 upward or outward in a brake applying direction. The other arm of the bell crank 93 is connected to a push rod 95. This carries an adjustable thrust member 96 threaded thereon and locked in place by a check nut 97. The thrust member 96 telescopes into and enters into a one-way thrust engagement with a sleeve member 98 pivoted to the lever 13.

The parts are preferably so adjusted that when the shoulder 89 picks up the valve 77 to lift the same the thrust member 96 will have moved slightly out of thrust relation with the sleeve 98. This is to allow a little lost motion or interval between the position at which the throttle commences to open and the position at which the brake commences to apply, or this interval may be reduced as desired, the limit being zero. Obviously it is undesirable to have the throttle open and the brake even slightly applied at the same time.

The characteristics of the spring 69 are of the utmost importance. In order to secure fine graduation at the commencement of application, the spring 69 should be unstressed or practically so when piston 67 is in its lowermost (full release) position. This de'ermines its length.

The strength of spring 69 should be such that the greatest available suction (i. e. the lowest absolute pressure available at any time in the intake manifold of the engine) will cause the piston 67 to move just to its limit of motion. With the average engine, sudden closure of the throttle valve 10 to the idling position when the engine is running at high speed will cause the intake manifold pressure to drop to about 2.5 pounds per square inch, absolute, giving a maximum effective pressure differential on the piston 67 and on the brake piston 45. of about 12.2 pounds per square inch. The strength of spring 69 is so chosen with reference to the area of piston 67 that this piston will move inward to its limit of motion when subjected to a pressure differential of approximately 12.2 pounds per square inch. This value is approximate and is stated for purposes of illustration. It is subject to variation according to the characteristics of particular engines.

At car speeds of from four to five miles per hour, which correspond roughly to the idling speeds of most engines, the pressure in the intake manifold with the engine clutched and the throttle valve 10 in idling position, is commonly about five pounds per square inch, absolute, giving an available pressure differential for braking purposes of about 9.7 pounds per square inch. It follows that full brake applications at high engine speeds are relatively severe, because of the relatively high available pressure differential, and that the application will taper off to about 80% of its initial force as the engine slows to idling speed. If the engine remains clutched, engine speed falls with the car speed and the braking pressure will fall at a related rate to about 80% of its initial value.

This gives desirable braking characteristics. It is well known in the braking art that a severe application at high speed followed by a reduction as the speed diminishes, is the ideal condition for quick stops wthout skidding.

By a proper selection of spring very close and smooth graduation can be secured and the desired result is enhanced by the gradual throttling effect of the bevels 81 and 82 on the manually operated valve.

In order to trace the operation of the device, let us assume that the operator has placed his foot on the button 87 and depressed it far enough to reach the clearance point just mentioned, at which the valve 77 is moved to its lowermost position and the thrust member 96 is just about to pick up the thrust member 98. The operator can feel this point for when he does pick up the thrust member 98 he will feel the added resistance of the spring 16. If he depresses the pedal further and further he merely opens the throttle valve 10, the shoulder 89 leaving the valve 77 which thereafter is held in its released position against the portion 76 by the thrust action of the spring 88. Thus the throttle opening occurs in a perfectly normal manner and the ensuing closing action will occur in the same manner, being terminated when the screw 14 engages the stop 15. If the operator thereafter permits the button 87 to rise further, under the urge of spring 94, the thrust member 96 will recede from the member 98 leaving the throttle valve 10 in idling position. After a slight motion, determined by the degree of lost motion above explained, the shoulder 89 will engage the valve 77 and move it upward from the release position shown in Fig. 2. The first effect is to blank the exhaust port 74 and as soon as this port has been completely blanked the head 78 will begin to clear the suction port 72 which it connects with the cylinder port 73 (see Fig. 3). The effect is to cause air to flow from the left end of the cylinder 38 to the intake manifold.

The brake applies in an obvious manner, but as the pressure in the brake cylinder passage 62 falls the reduced pressure will be communicated to the cylinder 65. Thereupon preponderating atmospheric pressure acting on the piston 67 will move this piston up and will so position the member 66 relatively to the valve 77 that the ports 72 and 74 are simultaneously blanked. This is the lap position shown in Fig. 4. In ordinary operation piston 67 follows valve 77 so closely that ports 72 and 74 are rarely fully opened but are throttled by the tapered portions 82, 81 of valve 77.

In lap position brake cylinder leakage, if it should occur, would result in increased absolute pressure in the evacuated end of the brake cylinder. Consequently the piston 67 will move downward re-establishing a throttled suction connection to the brake cylinder and restoring the effective braking action. The operator can progressively increase the braking action or decrease the same by allowing the valve 77 to move upward or by pressing it downward, respectively. It will be observed that he can gradually apply the brake to the full power available, or gradually release it, or vary the brake pressure at will.

If he should allow the button 87 to rise to the limit of its motion, or if his foot should slip off the pedal, valve 77 would move instantly to its uppermost limit of motion in which position it has moved so far that it can not be overtaken by the valve seat member 66, whose motion is limited by collision of the piston 67 with the lower end of the guide for the member 66 (see Fig. 5). It follows therefore that under the condition mentioned the left hand end of the brake cylinder is continually connected with the intake manifold, and the brakes will apply with full force.

The effect of a sudden application at high speed is to produce a very severe initial application, at a time when, under well understood principles, a severe application will not cause sliding of the wheels. Assuming that the engine remains clutched, the retardation of the engine as the car slows down will produce a reduction of the intake suction, with a consequent reduction of braking effect. Thus it is true in emergency applications, and also true to a certain extent in service applications, particularly where the engine is allowed to remain clutched, that the braking effect tapers off as the car slows down. There is therefore less tendency for skidding to occur and yet a maximum initial application is attained.

While I have shown the brake valve mounted in the footboard, it is obviously susceptible of being mounted in a similar mechanical relation to the throttle valve, in other positions, and while I prefer the arrangement illustrated, I do not confine myself to it. Furthermore, while the brake valve derives peculiar advantages when mechanically related to the accelerator mechanism, and so arranged as automatically to apply the brakes if the accelerator mechanism is released, certain of its advantages are attainable regardless of these details. It will be observed that where used with a suction intake vacuum system, the brake graduating characteristics of the valve are of very great importance, and these characteristics are present in a considerable degree whether interconnection with the throttle be adopted or not.

What is claimed is,—

1. In an automotive power plant, the combination of an internal combustion engine having an intake manifold and a throttle valve controlling the supply of fuel to the manifold, the engine when operating maintaining in said manifold a sub-atmospheric pressure which varies under varying conditions of operation; a brake cylinder; a piston in said cylinder constantly subject on one side to atmospheric pressure; a connection from said cylinder at the other side of said piston; and a valve mechanism connected to said connection and in communication with said manifold, and having an atmospheric port, said valve mechanism including two coacting movable valve members, a loaded motor means responsive to various depressions of pressure in the brake cylinder to move one of said members corresponding distances, and manual means for moving the other of said valve members, said members according to their relative positions serving alternately to connect the brake cylinder connection to the manifold or to the atmospheric port or to disconnect it from both.

2. In an automotive power plant, the combination of an internal combustion engine having an intake manifold, and a throttle valve controlling the supply of fuel to the manifold, the engine when operating maintaining in said manifold a sub-atmospheric pressure which varies with varying operative conditions; yielding means for urging said throttle valve closed; a brake cylinder; a piston in said cylinder constantly subject on one side to atmospheric pressure; a connection from said cylinder at the other side of said piston; a valve mechanism connected to said connection and in communication with said manifold and having an atmospheric port, said valve mechanism including two coacting movable members, a loaded motor means responsive to various depressions of pressure in the brake cylinder to move one of said members corresponding distances, and yielding means urging the other of said members in a brake releasing direction; and a common actuating means having relatively opposed thrust engagements with said other valve member and with said throttle valve to move them selectively against their respective yielding means according as said actuating member is moved in reverse directions.

3. In an automotive power plant, the combination of an internal combustion engine having an intake manifold, and a throttle valve controlling the supply of fuel to the manifold, the engine when operating maintaining in said manifold a sub-atmospheric pressure which varies with varying operative conditions; yielding means for urging said throttle valve closed; a brake cylinder; a piston in said cylinder constantly subject on one side to atmospheric pressure; a connection from said cylinder at the other side of said piston; a valve mechanism connected to said connection and in communication with said manifold and having an atmospheric port, said valve mechanism including two coacting movable members, a loaded motor means responsive to various depressions of pressure in the brake cylinder to move one of said members corresponding distances, and yielding means urging the other of said members in a brake releasing direction; a common actuating means having relatively opposed thrust engagements with said other valve member and with said throttle valve to move them selectively against their respective yielding means according as said actuating member is moved in reverse directions; and yielding means constantly urging said common actuating member in a brake applying direction.

4. In a brake valve, the combination of a housing having a cylinder and a guideway, there being a suction connection and a brake cylinder connection leading to respective ports in said guideway; a piston in said cylinder subjected on opposite sides to atmospheric pressure and the pressure in said brake cylinder connection; loading means for said piston; a valve seat movable in said guideway, operatively connected with said piston to be moved thereby and having an atmospheric port, and ports communicating respectively with the suction and brake cylinder ports in said housing; and a valve coacting with said seat and adapted to connect the brake cylinder port therein selectively with the suction and atmospheric ports and to disconnect it from both.

5. In a brake valve, the combination of a housing having a cylinder and a guideway, there being a suction connection and a brake cylinder connection leading to respective ports in said guideway; a piston in said cylinder subjected on opposite sides to atmospheric pressure and the pressure in said brake cylinder connection; loading means for said piston; a valve seat movable in said guideway, operatively connected with said piston to be moved thereby and having an atmospheric port, and ports communicating respectively with the suction and brake cylinder ports in said housing; a valve having a longitudinal guideway, said valve coacting with said seat and adapted to connect the brake cylinder port therein selectively with the suction and atmospheric ports and to disconnect it from both; a throttle connector mounted in said guideway and in one way thrust engagement with said valve; and a spring for maintaining said thrust engagement.

6. In a brake valve, the combination of a housing having a cylinder and a valve seat guideway, there being a suction connection and a brake cylinder connection leading to respective ports in said guideway; a piston in said cylinder, subject on its opposite sides to atmospheric pressure and the pressure in said brake cylinder connection; loading means for said piston; a tubular valve seat in said guideway, operatively connected with said piston to be moved thereby and having an atmospheric port, and ports communicating respectively with the suction and brake cylinder ports in said housing; a piston valve having an axial guideway, said valve sliding in said tubular seat and being adapted to connect the brake cylinder port therein selectively with the suction and atmospheric ports and to disconnect it from both; a throttle actuator slidable through said axial guideway and in unidirectional thrust relation with said piston valve; and a spring urging said valve into such thrust engagement.

7. In an automotive power plant, the combination of an internal combustion engine having an intake manifold and a throttle valve controlling the supply of fuel to the manifold, the engine when operating maintaining in said manifold a sub-atmospheric pressure which varies under varying conditions of operation; a brake cylinder; a piston in said cylinder constantly subject on one side to atmospheric pressure; a valve housing having a cylinder and a valve seat guideway, there being a connection to said manifold and a connection to said brake cylinder which lead to respective ports in said guideway; a piston in the cylinder in said housing and subject on its opposite sides to atmospheric pressure and the pressure in said brake cylinder connection; loading means for said piston; a tubular valve seat in said guideway operatively connected with said piston to be moved thereby and having an atmospheric port and ports communicating respectively with the manifold and brake cylinder ports in said guideway; a piston valve having an axial guideway, said valve sliding in said tubular seat and being adapted to connect the brake cylinder port thereof selectively with the suction and atmospheric ports and to disconnect it from both; a throttle actuator slidable through said axial guideway and in unidirectional thrust relation with said piston valve; a reverse acting unidirectional thrust connection between said actuator and said throttle valve; yielding means urging said throttle valve toward closed position and said piston valve toward brake releasing position; and yielding means establishing a normal position of said throttle actuator.

8. In an automotive power plant, the combination of an internal combustion engine having an intake manifold and a throttle valve controlling the supply of fuel to the manifold, the engine when operating maintaining in said manifold a sub-atmospheric pressure which varies under varying conditions of operation; a brake cylinder; a piston in said cylinder constantly subject on one side to atmospheric pressure; a valve housing having a cylinder and a valve seat guideway, there being a connection to said manifold and a connection to said brake cylinder which lead to respective ports in said guideway; a piston in the cylinder in said housing and subject on its opposite sides to atmospheric pressure and the pressure in said brake cylinder connection; loading means for said piston; a tubular valve seat in said guideway operatively connected with said piston to be moved thereby and having an atmospheric port and ports communicating respectively with the manifold and brake cylinder ports in said guideway; a piston valve having an axial guideway, said valve sliding in said tubular seat and being adapted to connect the brake cylinder port thereof selectively with the suction and atmospheric ports and to disconnect it from both; a throttle actuator slidable through said axial guideway and in unidirectional thrust relation with said piston valve; a reverse acting unidirectional thrust connection between said actuator and said throttle valve; yielding means urging said throttle valve toward closed position and said piston valve toward brake releasing position; and yielding means urging said throttle actuator in brake applying direction.

9. In a brake valve, the combination of a housing having a cylinder and a valve seat guideway, there being a suction connection and a brake cylinder connection leading to respective ports in said guideway; a piston in said cylinder subject on its opposite sides to atmospheric pressure and the pressure in said brake cylinder connection; loading means for said piston; a tubular valve seat in said guideway operatively connected with said piston to be moved thereby, and having atmospheric ports and ports connecting respectively with the suction and brake cylinder ports in said housing; a piston valve axially slidable in said guideway and having heads cooperating with the ports therein to connect the brake cylinder port selectively with the suction and atmospheric ports and to disconnect it from both, said valve having substantially zero lap with beveled throttling extensions functionally effective upon slight displacements of the valve from lap position; and means for shifting said valve.

10. In a brake valve, the combination of a housing having a cylinder and a valve seat guideway, there being a suction connection and a brake cylinder connection leading to respective ports in said guideway; a piston in said cylinder subject on its opposite sides to atmospheric pressure and the pressure in said brake cylinder connection; a spring for loading said piston of such length as to be unstressed in released condition, and of such elasticity as to be completely overpowered only by the maximum available suction; a tubular valve seat in said guideway operatively connected with said piston to be moved thereby, and having atmospheric ports and ports connecting respectively with the suction and brake cylinder ports in said housing; a piston valve axially slidable in said guideway and having heads cooperating with the ports therein to connect the brake cylinder port selectively with the suction and atmospheric ports and to disconnect it from both, said valve having substantially zero lap; and means for shifting said valve.

11. In a brake valve, the combination of a housing having a cylinder and a valve seat guideway, there being a suction connection and a brake cylinder connection leading to respective ports in said guideway; a piston in said cylinder subject on its opposite sides to atmospheric pressure and the pressure in said brake cylinder connection; a spring for loading said piston of such length as to be unstressed in release condition, and of such elasticity as to be completely overpowered only by the maximum available suction; a tubular valve seat in said guideway operatively connected with said piston to be moved thereby, and having atmospheric ports and ports connecting respectively with the suction and brake cylinder ports in said housing; a piston valve axially slidable in said guideway and having heads cooperating with the ports therein to connect the brake cylinder port selectively with the suction and atmospheric ports and to disconnect it from both, said valve having substantially zero lap with beveled throttling extensions functionally effective upon slight displacements of the valve from lap position; and means for shifting said valve.

12. In a brake valve, the combination of a housing having a cylinder and an alined guideway extending through the housing, there being a suction connection and a brake cylinder connection leading to respective ports in said guideway; a piston in said cylinder subject on opposite sides to atmospheric pressure and to the pressure in said brake cylinder connection; a loading spring for said piston acting in opposition to atmospheric pressure; a valve seat movable in said guide way, operatively connected with said piston to be moved thereby and having an atmospheric port and ports connecting respectively with the suction and brake cylinder ports in said housing; a valve having a longitudinal guideway, said valve coacting with said seat and being adapted to connect the brake cylinder port therein selectively with the suction and atmospheric ports and to disconnect it from both; and a throttle actuator operatively connected with said valve, guided in the guideway therein, and extending entirely through said housing with both of its ends exposed exteriorly of the housing.

13. In a brake valve, the combination of a housing having a cylinder and an alined guideway for a valve seat, there being a suction connection and a brake cylinder connection leading to respective ports in said guideway; an annular piston in said cylinder subject on its opposite sides to atmospheric pressure and to the pressure in said brake cylinder connection; a loading spring resisting the action of atmospheric pressure on said piston; a tubular valve seat in said guideway directly connected with said piston, to be moved thereby, and having an atmospheric port and ports communicating respectively with the suction and brake cylinder ports in said housing; a tubular piston valve, said valve sliding in said tubular seat and being adapted to connect the brake cylinder port therein selectively with the suction and atmospheric ports and to disconnect it from both; and a throttle actuator operatively related with said tubular valve and extending through the same, the ends of said actuator being exposed exteriorly of said housing and valve.

14. The combination of a throttle; a brake valve having a guideway extending through the same; an actuator for said throttle, said actuator being guided in said guideway and capable of excess motion beyond throttle closed position; and a lost motion connection between said actuator and the brake valve effective to actuate the brake valve in such excess motion range of the actuator.

15. The combination of a throttle; a brake valve including a tubular valve seat, a tubular valve coacting with said seat, and pressure actuated means responsive to braking pressure for shifting said seat; an actuator operatively connected with said throttle and slidable through said tubular valve, said actuator being capable of excess motion beyond throttle closed position; and a lost motion connection between said actuator and said tubular valve and effective to actuate said tubular valve in said excess motion range.

16. The combination with a motor vehicle having a foot-board, a propelling motor, and fluid actuated brakes, of a throttle for controlling said motor; a brake valve having a body mounted in said foot-board, and a shiftable valve element guided in said body; a throttle actuator operatively connected with said throttle, and extending through said valve element, said actuator having excess motion beyond throttle closed position; a lost motion connection between said actuator and said valve element and effective to actuate the valve element in said excess motion range; and a foot button associated with said actuator.

17. The combination with a motor vehicle including a foot-board, a propelling motor, and fluid actuated brakes, of a throttle for controlling said motor; a brake valve mounted in an aperture in said foot-board, said brake valve including a body, a tubular valve seat slidably mounted in said body, a piston subject to braking pressure for shifting said valve seat, and a tubular valve slidable in said valve seat; a throttle actuator operatively connected with said throttle and capable of excess motion beyond throttle closed position; a lost motion connection between said actuator and said tubular valve, effective to actuate said valve in said excess motion range; and a foot button associated with said actuator.

In testimony whereof I have signed my name to this specification.

CHARLES A. CAMPBELL.